United States Patent
Xu et al.

(10) Patent No.: US 11,650,990 B2
(45) Date of Patent: May 16, 2023

(54) METHOD, MEDIUM, AND SYSTEM FOR JOINING DATA TABLES

(71) Applicant: Alibaba Group Holding Limited, Grand Cayman (KY)

(72) Inventors: Dong Xu, Hangzhou (CN); Weiguang Sun, Hangzhou (CN); Jiehong Lian, Hangzhou (CN); Longzhong Wang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 424 days.

(21) Appl. No.: 16/084,529

(22) PCT Filed: Feb. 27, 2017

(86) PCT No.: PCT/CN2017/075065
§ 371 (c)(1),
(2) Date: Sep. 12, 2018

(87) PCT Pub. No.: WO2017/157160
PCT Pub. Date: Sep. 21, 2017

(65) Prior Publication Data
US 2019/0171639 A1    Jun. 6, 2019

(30) Foreign Application Priority Data

Mar. 14, 2016 (CN) .......................... 201610141198.4

(51) Int. Cl.
G06F 16/2455 (2019.01)
G06F 16/2453 (2019.01)
G06F 16/28 (2019.01)

(52) U.S. Cl.
CPC .... *G06F 16/2456* (2019.01); *G06F 16/24544* (2019.01); *G06F 16/283* (2019.01)

(58) Field of Classification Search
CPC ........... G06F 16/2456; G06F 16/24544; G06F 16/283
See application file for complete search history.

(56) References Cited

U.S. PATENT DOCUMENTS

| | | |
|---|---|---|
| 2004/0133538 A1 | 7/2004 | Amiri et al. |
| 2004/0153435 A1 | 8/2004 | Gudbjartsson et al. |
| 2005/0187917 A1 | 8/2005 | Lawande et al. |
| 2005/0198001 A1 | 9/2005 | Cunningham et al. |
| 2006/0080285 A1 | 4/2006 | Chowdhuri |
| 2006/0248592 A1 | 11/2006 | Agrawal et al. |

(Continued)

FOREIGN PATENT DOCUMENTS

| | | |
|---|---|---|
| CN | 101408900 | 4/2009 |
| CN | 101739398 A | 6/2010 |

(Continued)

OTHER PUBLICATIONS

Cutt, Bryce et al., "Improving Join Performance for Skewed Databases", Canadian Conference on Electrical and Computer Engineering, Jul. 15, 2008.

*Primary Examiner* — Grace Park

(57) ABSTRACT

Data tables that are located in a distributed data warehouse are joined with a target join-calculating algorithm that has been selected from a number of table joining algorithms which have been compared to each other based on the execution costs of each of the number of table joining algorithms.

20 Claims, 7 Drawing Sheets

(56) References Cited

U.S. PATENT DOCUMENTS

| | | |
|---|---|---|
| 2007/0043531 A1 | 2/2007 | Kosche et al. |
| 2008/0016074 A1 | 1/2008 | Ben-dyke et al. |
| 2008/0027904 A1 | 1/2008 | Hill et al. |
| 2008/0040348 A1 | 2/2008 | Lawande et al. |
| 2008/0172356 A1 | 7/2008 | Bruno et al. |
| 2008/0177756 A1 | 7/2008 | Kosche et al. |
| 2008/0243772 A1 | 10/2008 | Fuxman et al. |
| 2009/0024572 A1* | 1/2009 | Mehta ............... G06F 16/24542 |
| 2010/0131490 A1 | 5/2010 | Lamb et al. |
| 2010/0191720 A1* | 7/2010 | Al-Omari ......... G06F 16/24542 707/718 |
| 2010/0293135 A1 | 11/2010 | Candea et al. |
| 2010/0312762 A1 | 12/2010 | Yan et al. |
| 2011/0246448 A1 | 10/2011 | Tatemura et al. |
| 2011/0302151 A1 | 12/2011 | Abadi et al. |
| 2012/0078951 A1 | 3/2012 | Hsu et al. |
| 2012/0166446 A1 | 6/2012 | Bowman et al. |
| 2012/0203740 A1 | 8/2012 | Ben-Dyke et al. |
| 2012/0246147 A1 | 9/2012 | Lamb et al. |
| 2013/0262443 A1 | 10/2013 | Leida et al. |
| 2014/0181076 A1* | 6/2014 | Au ...................... G06F 16/2456 707/714 |
| 2014/0317085 A1* | 10/2014 | Wehrmeister ..... G06F 16/24544 707/714 |
| 2015/0066986 A1 | 3/2015 | Piecko |
| 2015/0234896 A1* | 8/2015 | Dageville ............. G06F 9/4881 707/714 |
| 2016/0299952 A1 | 10/2016 | Cialini et al. |
| 2016/0314176 A1 | 10/2016 | Dhayapule et al. |
| 2016/0328445 A1* | 11/2016 | Zhu ................... G06F 16/24544 |
| 2017/0104627 A1* | 4/2017 | Bender ............... H04L 67/1008 |
| 2017/0249360 A1* | 8/2017 | Alpers ............... G06F 16/24545 |

FOREIGN PATENT DOCUMENTS

| | | |
|---|---|---|
| CN | 102929996 A | 2/2013 |
| CN | 102968420 A | 3/2013 |
| CN | 103927346 | 7/2014 |

* cited by examiner

METHOD, MEDIUM, AND SYSTEM FOR JOINING DATA TABLES

CROSS-REFERENCE TO RELATED APPLICATIONS

This application is a National Stage Application of, and claims priority to, International Patent Application PCT/CN2017/075065, filed on Feb. 27, 2017, which claims priority from Chinese Patent Application No. CN 201610141198.4, filed on Mar. 14, 2016, which applications are incorporated herein by reference in their entirety.

BACKGROUND

1. Technical Field

The present application relates to databases and, in particular, to a method, a medium, and a system for joining data tables.

2. Description of the Related Art

With the development of the Internet, the amount of data increased tremendously and data structures began to diversify. More and more information can be included in the data. In this context, data warehouses play a huge role. Because of the arriving era of big data, data warehouses have changed to have distributed architectures to meet the tremendously increased computation and storage needs. Distributed data warehouses generally use column-based storage, and the data is stored in the form of files. Therefore, the use of distributed data warehouses can improve the storage and computation performance of big data.

In the process of querying a distributed data warehouse, it is often necessary to perform join calculations to join data tables. There are many join algorithms which can used to implement the join calculations. The amount of data that can be processed by different join algorithms and the various resources consumed are generally different.

SUMMARY

The present disclosure provides an appropriate join algorithm to join data tables in a distributed data warehouse, thereby saving resources of the distributed data warehouse and improving the query efficiency. The present invention includes a method of joining data tables that includes determining a plurality of to-be-joined data tables in a distributed data warehouse that has a plurality of computing nodes and a plurality of storage nodes. The method also includes obtaining a plurality of table joining algorithms, and estimating a plurality of execution costs for the plurality of table joining algorithms such that each table joining algorithm has an estimated execution cost to join the plurality of to-be-joined data tables. In addition, the method includes selecting a target algorithm from the plurality of table joining algorithms based on the estimated execution cost of each table joining algorithm, and joining the plurality of to-be-joined data tables with the target algorithm.

The present disclosure also includes a non-transitory computer-readable medium that has computer executable instructions stored thereon that when executed by a processor cause the processor to implement a method of joining data tables. The method includes determining a plurality of to-be-joined data tables in a distributed data warehouse that has a plurality of computing nodes and a plurality of storage nodes. The method also includes obtaining a plurality of table joining algorithms, and estimating a plurality of execution costs for the plurality of table joining algorithms such that each table joining algorithm has an estimated execution cost to join the plurality of to-be-joined data tables. In addition, the method includes selecting a target algorithm from the plurality of table joining algorithms based on the estimated execution cost of each table joining algorithm, and joining the plurality of to-be-joined data tables with the target algorithm.

The present disclosure further includes a system for joining data tables. The system includes a memory and a processor coupled to the memory. The processor to determine a plurality of to-be-joined data tables in a distributed data warehouse that has a plurality of computing nodes and a plurality of storage nodes. The processor to further obtain a plurality of table joining algorithms, and estimate a plurality of execution costs for the plurality of table joining algorithms such that each table joining algorithm has an estimated execution cost to join the plurality of to-be-joined data tables. The processor to also select a target algorithm from the plurality of table joining algorithms based on the estimated execution cost of each table joining algorithm, and join the plurality of to-be-joined data tables with the target algorithm.

A better understanding of the features and advantages of the present invention will be obtained by reference to the following detailed description and accompanying drawings which set forth an illustrative embodiment in which the principals of the invention are utilized.

BRIEF DESCRIPTION OF THE DRAWINGS

The accompanying drawings described herein are used for providing further understanding of the present application and constitute a part of the present application. Exemplary embodiments of the present application and the description thereof are used for explaining the present application and do not constitute limitations on the present application.

DETAILED DESCRIPTION

Figure 1:
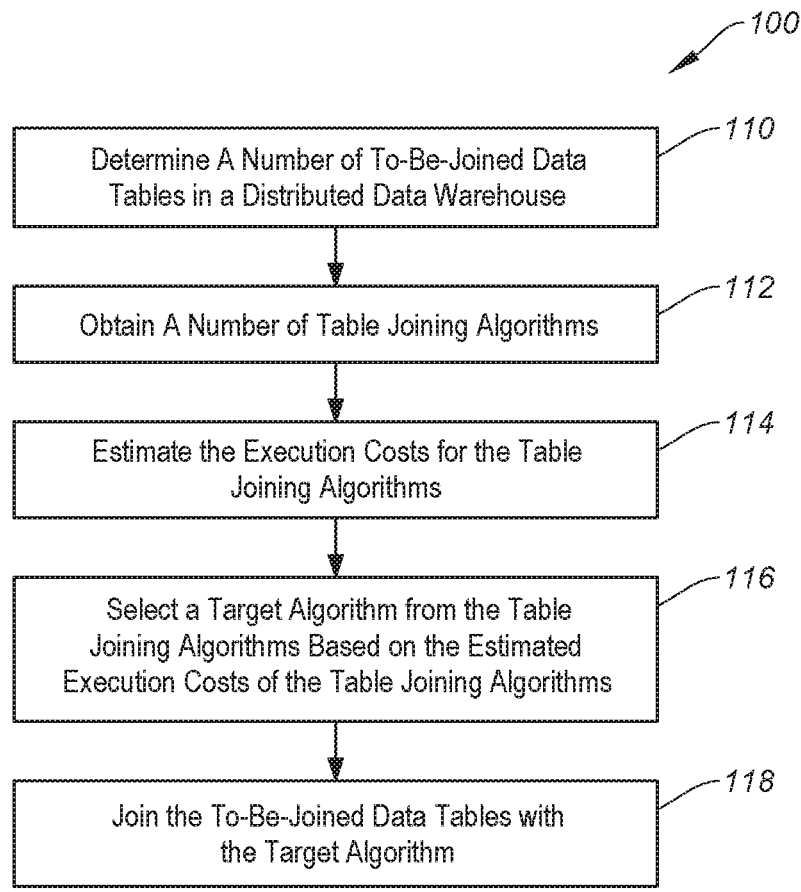
FIG. 1 is a flowchart illustrating an example of a method 100 of joining data tables in accordance with the present invention.

FIG. 1 shows a flowchart that illustrates an example of a method 100 of joining data tables in accordance with the present invention. As shown in FIG. 1, method 100 begins at 110 by determining a number of to-be-joined data tables in a distributed data warehouse that has a number of computing nodes and a number of storage nodes that are coupled to the number of computing nodes.

For example, in the field of e-commerce, it may be necessary to jointly query an order table and a customer table. At this point, join calculations need to be performed on the order table and the customer table. Therefore, a data table join task may be submitted to a processing device to join the data tables. Identifiers for the order table and the customer table are carried in the data table join task. Based on the data table join task, the processing device determines that the to-be-joined data tables include the order table and the customer table.

Following this, method 100 moves to 112 to obtain a number of table joining algorithms. After the to-be-joined data tables have determined, the processing device uses an appropriate table joining algorithm (an appropriate data table join type) to perform join calculations on the to-be-joined data tables. In order to select the appropriate data table join type to perform join calculations on the to-be-joined data tables to save the resources of the distributed data warehouse and improve the query efficiency, the processing device selects a number of data table join types as data table join type candidates.

Next, method 100 moves to 114 to estimate the execution costs for the table joining algorithms such that each table joining algorithm has an estimated execution cost to join the to-be-joined data tables. At this point, the processing device estimates an execution cost for each data table join type candidate in performing join calculations on the to-be-joined data tables.

After this, method 100 moves to 116 to select a target algorithm from the table joining algorithms based on the estimated execution cost of each table joining algorithm. At this point, the processing device selects a data table join type suitable for performing join calculations on the to-be-joined data tables from the data table join type candidates based on the estimated execution cost for each data table join type candidate in performing join calculations on the to-be-joined data tables. Method 100 then moves to 118 to join the to-be-joined data tables with the target algorithm.

Figure 2:
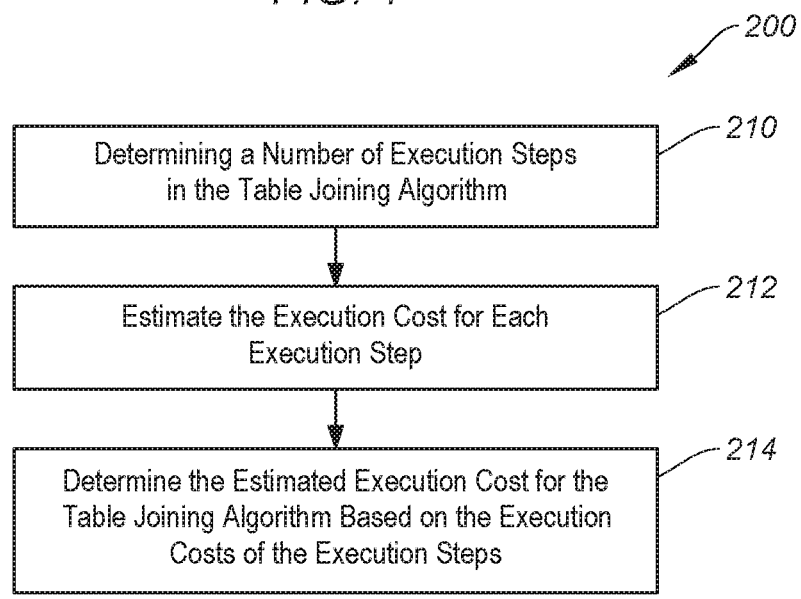
FIG. 2 is a flow chart illustrating an example of a method 200 of estimating an execution cost of a table joining algorithm of the number of table joining algorithms in accordance with the present invention.

FIG. 2 shows a flow chart that illustrates an example of a method 200 of estimating an execution cost of a table joining algorithm of the number of table joining algorithms in accordance with the present invention. As shown in FIG. 2, method 200 begins at 210 by determining a number of execution steps in the table joining algorithm. Following this, method 200 moves to 212 to estimate an execution cost for each execution step. Method 200 then moves to 214 to determine the estimated execution cost for the table joining algorithm based on the execution cost for each execution step.

Each execution step has a number of operations. The operations, in turn, include one or more key operations which have higher execution costs than other of the operations. In an embodiment of the present invention, the execution cost of an execution step is based on the execution cost of the one or more key operations in the execution step. The processing device determines, for each data table join type candidate, the execution steps of the data table join type candidate, and a key operation in each execution step.

The processing device estimates the execution cost for each table joining algorithm (data table join type selected as a data table join type candidate) based on the execution logic of each data table join type candidate. The execution logic of the data table join type candidate may be embodied through its execution steps and the key operation in the execution steps.

The key operation refers to an operation that mainly reflects the execution cost for the execution step. For example, if a cost for a certain operation in a certain aspect is greater than a preset value or much greater than costs of other operations in this aspect, it is determined that the operation is a key operation. In a relatively simple implementation, the execution costs of the key operations in the execution step may be superposed to obtain the execution cost for the execution step. Alternatively, the execution cost for the key operation in the execution step is directly used as the execution cost for the execution step.

In addition, a triple (data record number consumption, CPU consumption, and IO consumption) is used to represent the execution cost. In other words, an execution cost for one execution step or for one data table join type candidate may be described from three dimensions: the operated number of data records (RowCount), consumed CPU resources, and consumed IO resources. All execution costs of different data table join type candidates can be represented by using the above triple for comparison.

In a practical application scenario, commonly used table joining algorithms (data table join types) include, but are not limited to, a partitioned sort join (PSJ) data table join type; a broadcasted hash join (BHJ) data table join type; and a blocked hash join (BKHJ) data table join type. Each of the above PSJ data table join type, BHJ data table join type, and BKHJ data table join type can be used as the data table join type candidate in the present application.

Figure 3:
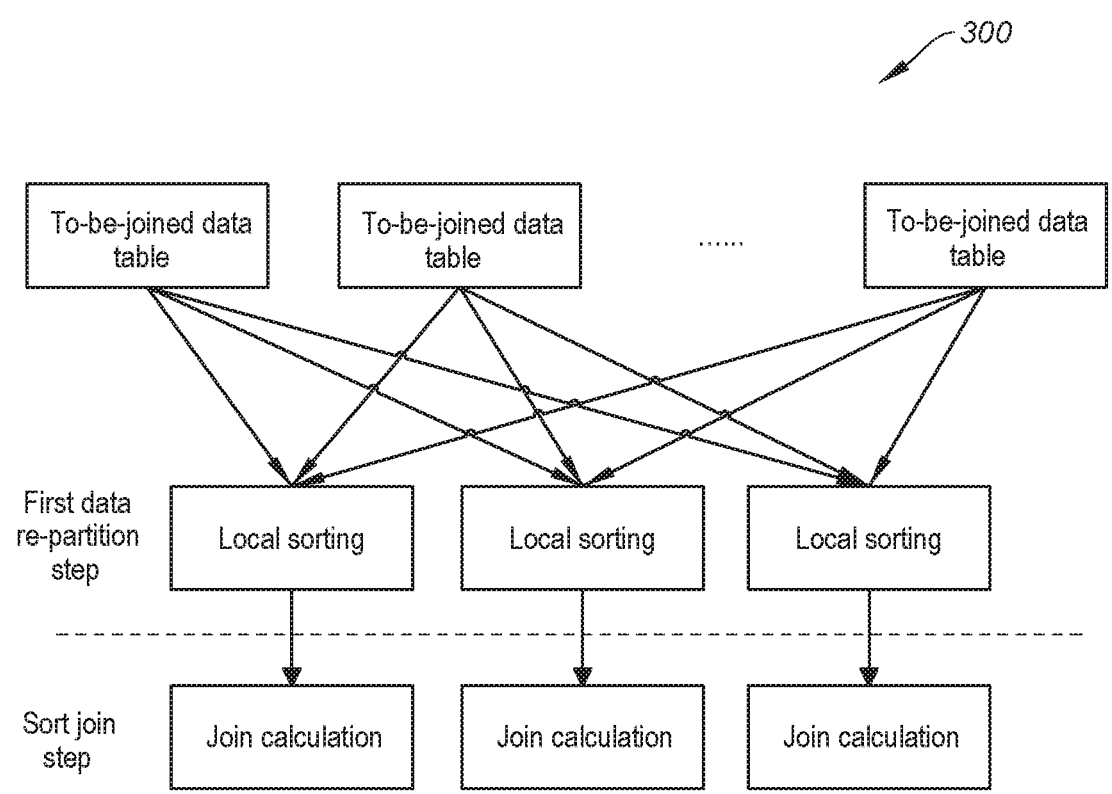
FIG. 3 is a diagram illustrating an example of an execution logic 300 of a PSJ table joining algorithm (data table join type) in accordance with the present invention.

FIG. 3 shows a diagram that illustrates an example of an execution logic 300 of a PSJ table joining algorithm (data table join type) in accordance with the present invention. As shown in FIG. 3, the PSJ table joining algorithm includes a re-partition step and a sort join step. The re-partition step is mainly to sort all of the to-be-joined data tables and distribute them to different computing nodes. The sort join step is mainly to obtain all data table combinations meeting join conditions that are outputted in the re-partition step and output them. Further, it can be determined that the key operations in the re-partition step include a local read operation, a network read operation, a local sort operation, and a local write operation. In addition, it can be determined that a key operation in the sort join step comprises an output operation.

Figure 4:
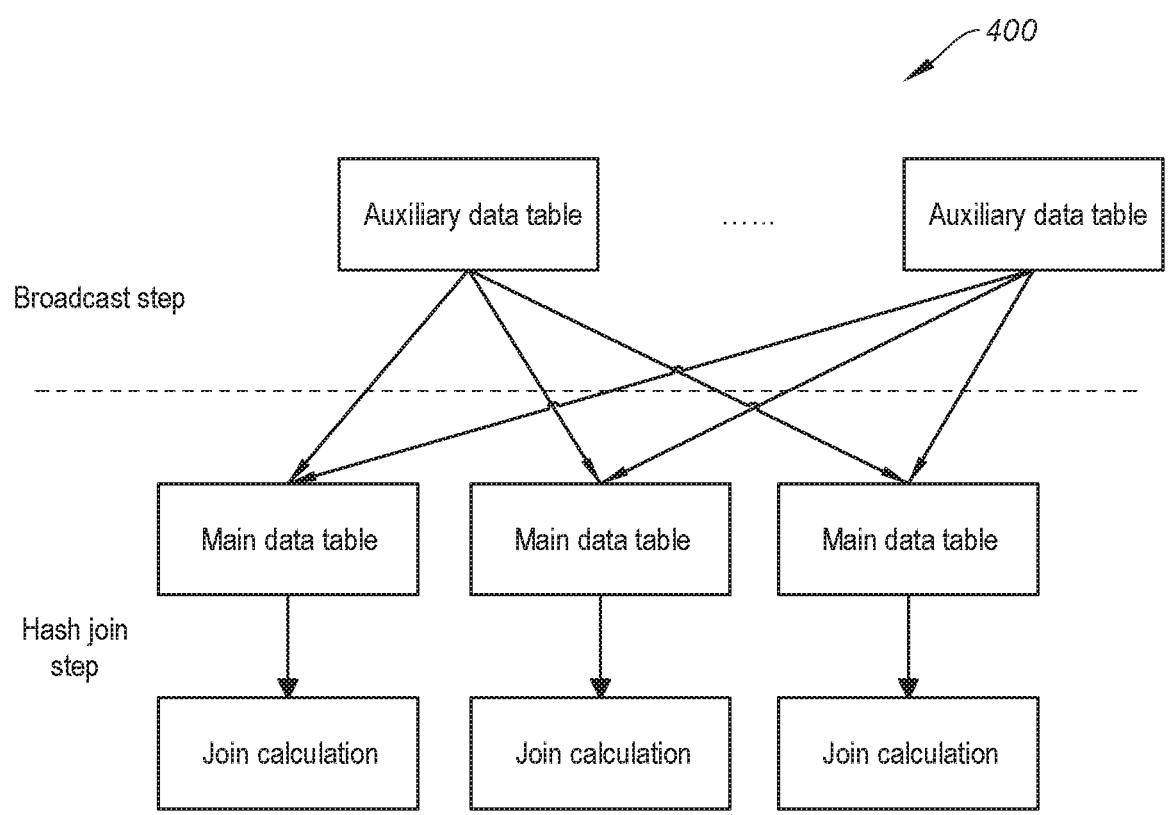
FIG. 4 is a diagram illustrating an example of an execution logic 400 of a BHJ table joining algorithm (data table join type) in accordance with the present invention.

FIG. 4 shows a diagram that illustrates an example of an execution logic 400 of a BHJ table joining algorithm (data table join type) in accordance with the present invention. As shown in FIG. 4, the BHJ table joining algorithm includes a broadcast step and a hash join step. In FIG. 4, the to-be-joined data tables having two data tables are taken as an example.

In the BHJ type, the largest data table in n data tables is used as a main data table. The remaining data tables are used as auxiliary data tables. The broadcast step of the BHJ type is mainly to distribute the auxiliary data tables to the main data table by means of network transmission. This means that the broadcast step includes a local read operation, a network read operation, and a local write operation.

In this embodiment, the network read operation is selected as the key operation in the broadcast step. However, the present application is not limited thereto. The hash join step is mainly to obtain all data table combinations meeting the join conditions through the hash algorithm and output them. Therefore, it can be determined that the hash join step includes hash calculations and an output operation. In this embodiment, the output operation is selected as the key operation in the hash join step. However, the present application is not limited thereto.

Figure 5:
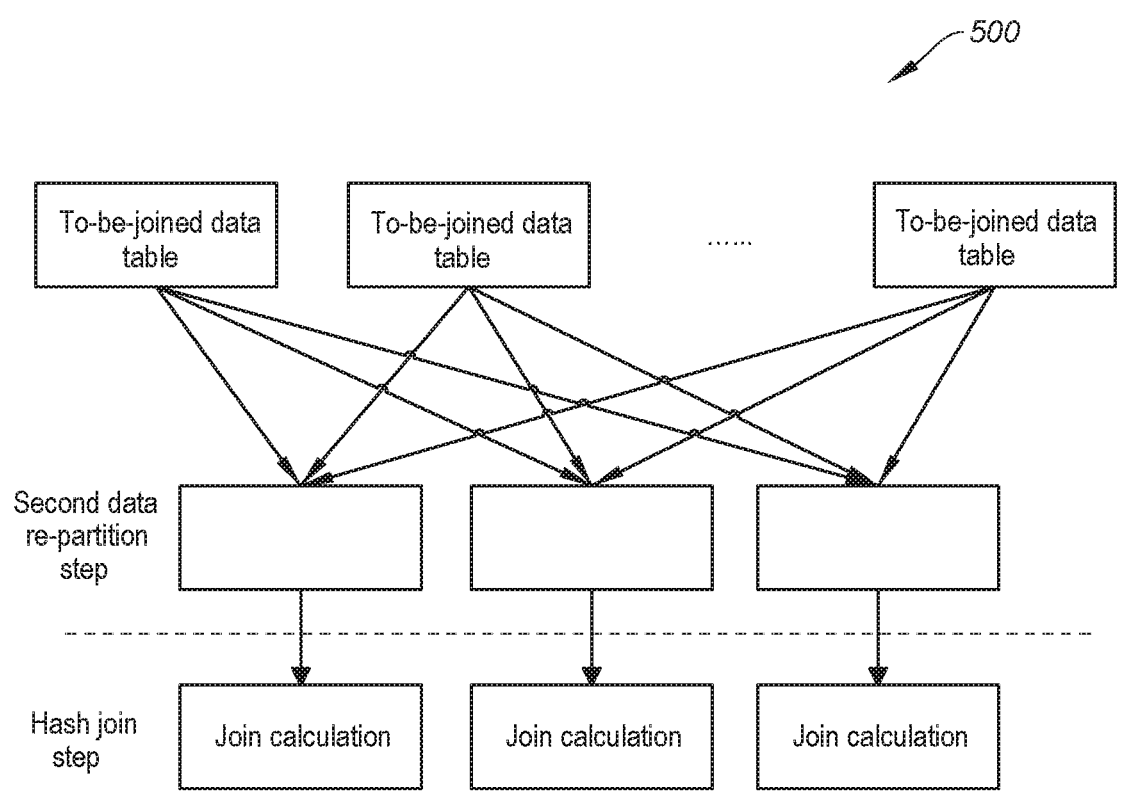
FIG. 5 is a diagram illustrating an example of an execution logic 500 of a BKHJ table joining algorithm (data table join type) in accordance with the present invention.

FIG. 5 shows a diagram that illustrates an example of an execution logic 500 of a BKHJ table joining algorithm (data table join type) in accordance with the present invention. As shown in FIG. 5, the BKHJ table joining algorithm includes a broadcast distribution step and a hash join step. The broadcast distribution step is mainly to distribute all of the to-be-joined data tables to different computing nodes. This means that the broadcast distribution step comprises a local read operation, a network read operation, and a local write operation.

In this embodiment, the local read operation, the network read operation, and the local write operation are used as key operations in the broadcast step. However, the present application is not limited thereto. The hash join step is mainly to obtain all data table combinations meeting the join conditions through the hash algorithm and output them. Therefore, it can be determined that the hash join step comprises hash calculations and an output operation. In this embodiment, the output operation is selected as the key operation in the hash join step. However, the present application is not limited thereto.

As noted above, the processing device estimates the execution cost for each table joining algorithm (data table join type selected as a data table join type candidate) based on the execution steps and the key operations in the execution steps of each data table join type candidate. In addition, the execution steps require parameter inputs that are specific to the distributed data warehouse. The execution cost for each execution step is estimated based on the key operation in each execution step, where the key operation obtains inputs from a parameter list. The execution cost for the data table join type candidate is obtained based on the execution cost for each execution step.

As a result, the processing device estimates an execution cost for each data table join type candidate in performing join calculations on the to-be-joined data tables based on parameters in a parameter list and the execution steps of each data table join type candidate. Further, an implementation of the above estimation of the execution cost for each execution step based on the parameters in the parameter list and the key operation in each execution step includes, for each execution step, target parameters needed for the execution step that are obtained from the parameter list. The execution cost for the key operation in the execution step is estimated based on the target parameters needed for the execution step, and the key operation in the execution step. The execution cost for the execution step is obtained based on the execution cost for the key operation in the execution step.

Specifically, the processing device determines the distributed data warehouse environment where the to-be-joined data tables are located. The processing device sets/determines the parameter list for cost estimation based on the distributed data warehouse environment where the to-be-joined data tables are located. The parameter list includes parameters needed for performing cost estimation on the data table join type candidate.

For example, in one implementation, the parameter list includes setting/determining the number of data records in each to-be-joined table, the total number of data records in the to-be-joined tables, and an average length of each data record included in each data table in the to-be-joined data tables. The implementation also includes setting/determining, based on a file system of the distributed data warehouse, a size of a data block supported by each storage node. The implementation further includes setting/determining, based on hardware information of the distributed data warehouse, unit costs for various operations needed for the join calculations, and a number of data records that each computing node can process.

In the implementation described above, the parameter list includes the following parameters: the number of data records, the total number of data records, and the average length of each data record contained in each data table, the size of the data block supported by each storage node, the unit costs of the various operations, and the number of data records that each computing node can process.

Because at least two data tables are needed for data table join calculations, the to-be-joined data tables include at least two data tables. Because each data table in the to-be-joined data tables contains certain data records, the number of data records contained in each data table can be obtained through calculation. The total number of data records can then be obtained by adding all the number of data records contained in each data table. Moreover, the total amount of data can be obtained based on the amount of data of the data records contained in each data table. Then, the average length of each data record can be obtained based on the total amount of data and the total number of data records.

Further, by analyzing the join calculations, it can be seen that the join operation involves reading from and/or writing to a data table. Further, the join calculation involves at least one of a local read operation, a local write operation, a network read operation, and a network write operation. Based on this, the unit costs of various operations needed for join calculations can be set based on the hardware information of the distributed data warehouse. Specifically, a unit cost for the local read operation and a unit cost for the local write operation may be determined based on a storage medium used by the distributed data warehouse.

For example, the storage medium used by the distributed data warehouse may be a disk, a flash memory, a U disk and the like. The required read time and write time of different storage media are generally different. Therefore, the processing device may determine the unit cost for the local read operation and the unit cost for the local write operation based on the storage medium. In addition, considering that the distributed data warehouse might read and write data tables across networks, the processing device may also determine a unit cost for the network read operation and a unit cost for the network write operation based on the network topology of the distributed data warehouse.

The above unit cost for the local read operation is defined as an average cost for reading 1-byte of data locally. The above unit cost for the local write operation is defined as an average cost for writing 1-byte of data locally. Similarly, the above unit cost for the network read operation is defined as an average cost for reading 1-byte of data over a network. The above unit cost for the network write operation is defined as an average cost for writing 1-byte of data over a network.

In addition, the distributed data warehouse includes a number of computing nodes and a number of storage nodes. When the execution cost for each data table join type candidate is estimated, a size of a data block supported by a storage node in the distributed data warehouse may be determined based on the file system of the distributed data warehouse. For example, it could be 256 MB. Moreover, the number of data records that a computing node can process is determined based on the hardware information of the distributed data warehouse. For example, it could be 1 GB.

As noted above, the PSJ type of table joining algorithm is a common algorithm that includes a re-partition step and a sort join step. The key operations in the re-partition step include a local read operation, a network read operation, a local sort operation, and a local write operation, while the key operation in the sort join step includes an output operation.

After determining the execution steps for the PSJ type and the key operation in each execution step, the processing device needs to obtain target parameters needed for the execution step from the parameter list for each execution step. Specifically: for the re-partition step in the PSJ type, the processing device may obtain parameters N, L, RC, RNC, and WC from the parameter list as the target parameters needed for the re-partition step. Here, N represents the total number of data records; L represents the average length of each data record; RC represents the unit cost for the local read operation; RNC represents the unit cost for the network read operation; and WC represents the unit cost for the local write operation.

For the sort join step in the PSJ type, the processing device may obtain $N_j$ and n from the parameter list as the target parameters needed for the sort join step. Here, $N_j$ represents the number of data records contained in the j-th data table in the to-be-joined data tables, where j=1 . . . n; n represents the number of data tables in the to-be-joined data tables.

After obtaining the target parameters needed for the re-partition step and the sort join step, the processing device may estimate the execution cost for the key operation in the re-partition step based on the target parameters needed for the re-partition step and the key operation in the re-partition step. Moreover, the processing device may estimate the execution cost for the key operation in the sort join step based on the target parameters needed for the sort join step and the key operation in the sort join step.

Specifically, for the re-partition step in the PSJ type, the processing device may estimate, based on the above parameters N, L, RC, RNC, and WC, that the execution cost for the local read operation represented as a triple is (0, 0, N*L*RC), the execution cost for the network read operation represented as a triple is (N, 0, N*L*RNC), the execution cost for the local sort operation represented as a triple is (0, N, 0), and the execution cost for the local write operation represented as a triple is (0, 0, N*L*WC). For the sort join step in the PSJ type, the processing device may estimate, based on the above parameters $N_j$ and n, that the execution cost for the output operation represented as a triple is (J, 0, 0), where $J=(\Pi N_j)^{1/n}$, i.e., $J=(N_1*N_2* \ldots *N_n)^{1/n}$.

After respectively obtaining the execution costs for the key operation in the re-partition step and the key operation in the sort join step, the processing device may obtain the execution cost for the re-partition step based on the execution cost for the key operation in the re-partition step and obtain the execution cost for the sort join step based on the execution cost for the key operation in the sort join step.

Specifically, for the re-partition step in the PSJ type, the processing device may superpose the execution cost (0, 0, N*L*RC) of the local read operation, the execution cost (N, 0, N*L*RNC) of the network read operation, the execution cost (0, N, 0) of the local sort operation, and the execution cost (0, 0, N*L*WC) of the local write operation to obtain an execution cost (N, N, N*L*(RC+RNC+WC)) as the execution cost for the re-partition step.

Further, alternatively, considering that in a distributed data warehouse scenario, data records in the to-be-joined data tables need to be distributed to P computing nodes. If data records distributed to each computing node are balanced, then the execution cost on each computing node is the same. Therefore, an execution cost for a corresponding operation can be calculated directly through a data amount N*L and a unit cost of the corresponding operation.

If data records distributed to each computing node are not balanced, because the network read operation and the local write operation need to wait for data on other computing nodes, the final execution costs for the network read operation and the local write operation need to be obtained by using a cost on a computing node (or referred to as a computing node with the largest consumption) where the largest number of data records locate as a reference and multiplying the reference with P.

In view of the above, prior to the step of for the re-partition step, superposing the execution cost (0, 0, N*L*RC) of the local read operation, the execution cost (N, 0, N*L*RNC) of the network read operation, the execution cost (0, N, 0) of the local sort operation, and the execution cost (0, 0, N*L*WC) of the local write operation to obtain an execution cost (N, N, N*L*(RC+RNC+WC)) as an execution cost for the re-partition step, the processing device may determine whether a skewed distribution occurs with respect to the data records contained in the to-be-joined data tables.

Specifically, statistical information called Top K values may be used to estimate the computing node with the largest consumption. Top K values refer to K values that are most frequently repeated in a column of data and their frequencies. Preferably, in order to simplify the complexity of the problem, we consider that K=1 and the ratio of the most frequently repeated values to the overall data is p, which is called a distribution skewness in the present application. p is compared with 1/P.

If p>1/P, then it can be determined that a skewed distribution of data occurs. At this point, the amount of data that needs to be processed by the computing node having the largest consumption is N*L*p. If p<=1/P, then it is determined that a skewed data distribution does not exist. At this point, the amount of data that needs to be processed by each computing node is N*L*1/P.

If the determination result is positive, i.e., a skewed data distribution occurs, then the execution cost (N, 0, N*L*RNC) of the network read operation is corrected to (N, 0, P*N*L*p*RNC). The execution cost (0, 0, N*L*WC) of the local write operation is corrected to (0, 0, P*N*L*p*WC). Here, p represents the distribution skewness. P represents the number of computing nodes for performing join processing on the to-be-joined data tables.

If the determination result is negative, i.e., a skewed data distribution does not exist, then the execution cost (N, 0, P*N*L*1/P*RNC) of the network read operation equals to (N, 0, N*L*RNC). Similarly, the execution cost (0, 0, P*N*L*1/P*WC) of the local write operation equals to (0, 0, N*L*WC).

In view of the above, if a skewed data distribution occurs, then the processing device needs to superpose the execution cost (0, 0, N*L*RC) of the local read operation, the corrected execution cost (N, 0, P*N*L*p*RNC) of the network read operation, the execution cost (0, N, 0) of the local sort operation, and the corrected execution cost (0, 0, P*N*L*p*WC) of the local write operation to obtain an execution cost (N, N, N*L*RC+P*N*L*p*(RNC+WC)) as the execution cost for the re-partition step.

For the sort join step in the PSJ type, the processing device may use the execution cost (J, 0, 0) of the output operation as the execution cost for the sort join step.

After obtaining the execution cost for the re-partition step and the execution cost for the sort join step, the processing device may superpose the execution costs of the two execution steps to obtain the execution cost for the PSJ type. Specifically, in the case where a skewed data distribution occurs, the execution cost for the PSJ type is (N+J, N, N*L*RC+P*N*L*p*(RNC+WC)). In the case where a skewed data distribution does not exist, the execution cost for the PSJ type is (N+J, N, N*L*(RC+RNC+WC)).

As further noted above, the BHJ type of table joining algorithm is also a common algorithm that includes a broadcast step and a hash join step. The key operations in the broadcast step include a local read operation, a network read operation, and a local write operation, while the key operation in the hash join step includes the output operation.

After determining the execution steps for the BHJ type and the key operation in each execution step, the processing device needs to obtain target parameters needed for the execution step from the parameter list for each execution step. Specifically, for the broadcast step of the BHJ type, the processing device may obtain parameters $N_i$, $N_k$, D, L, and RNC from the parameter list as the target parameters needed for the broadcast step.

Here, $N_k$ represents the number of data records contained in the main data table in the to-be-joined data tables, where k is any value of 1 . . . n. $N_i$ represents the number of data records contained in the i-th auxiliary data table in the to-be-joined data tables, where i=1 . . . n and i≠k. D represents the size of the data block supported by each storage node. L represents the average length of each data record. RNC represents the unit cost for the network read operation, and n represents the number of data tables in the to-be-joined data tables.

For the hash join step of the BHJ type, the processing device may obtain parameters $N_j$ and n from the parameter list as the target parameters needed for the hash join step. Here, $N_j$ represents the number of data records contained in the j-th data table in the to-be-joined data tables, where j=1 . . . n; n represents the number of data tables in the to-be-joined data tables.

After obtaining the target parameters needed for the broadcast step and the hash join step, the processing device may estimate the execution cost for the key operation in the broadcast step based on the target parameters needed for the broadcast step and the key operation in the broadcast step. Moreover, the processing device may estimate the execution cost for the key operation in the hash join step based on the target parameters needed for the hash join step and the key operation in the hash join step.

Specifically, for the broadcast step in the BHJ type, the processing device may estimate, based on the above parameters $N_i$, $N_k$, D, L, and RNC, that the execution cost for the network read operation represented as a triple is ($\Sigma N_i$*M, 0, $\Sigma N_i$*M*L*RNC), where M=$N_k$/D. For the hash join step in the BHJ type, the processing device may estimate, based on the above parameters $N_j$ and n, that the execution cost for the output operation represented as a triple is (J, 0, 0), where J=$(\Pi N_j)^{1/n}$.

Further, considering that the number of data records contained in the auxiliary data table might be greater than the size D of the data block supported by each storage node. In this case, the data records need to be written from an internal memory to an external memory. In other words, it turns into a nested loop join. In this case, since the cost for writing the data records from the internal memory to the external memory is very high, it is necessary to take this part of cost into consideration.

Based on the above content, before using the execution cost (J, 0, 0) of the output operation as the execution cost for the hash join step, the processing device needs to determine, in each auxiliary data table, whether a data table containing the number of data records greater than the size D of the data block supported by each storage node exists.

If the determination result is positive, then the processing device corrects the execution cost (J, 0, 0) of the output operation to obtain a corrected execution cost (J, $N_k$*$\Sigma N_l$, $N_k$*$\Sigma N_l$*L*WC) as the execution cost for the hash join step. Here, $N_l$ represents the l-th data table containing the number of data records greater than the size D of the data block supported by each storage node, where l=1 . . . n and l≠k.

After respectively obtaining the execution costs for the key operation in the broadcast step and the key operation in the hash join step, the processing device may obtain the execution cost for the broadcast step based on the execution cost for the key operation in the broadcast step and obtain the execution cost for the hash join step based on the execution cost for the key operation in the hash join step.

Specifically, for the broadcast step of the BHJ type, the processing device may use the execution cost ($\Sigma N_i$*M, 0, $\Sigma N_i$*M*L*RNC) of the network read operation as the execution cost for the broadcast step. For the hash join step of the BHJ type, if a data table containing the number of data records greater than the size D of the data block supported by each storage node exists in each auxiliary data table, then the processing device may use the corrected execution cost (J, $N_k$*$\Sigma N_l$, $N_k$*$\Sigma N_l$*L*WC) as the execution cost for the hash join step. If no data table containing the number of data records greater than the size D of the data block supported by each storage node exists in each auxiliary data table, then the processing device may use the execution cost (J, 0, 0) of the output operation as the execution cost for the hash join step.

After obtaining the execution cost for the broadcast step and the execution cost for the hash join step, the processing device may superpose the execution costs of the two execution steps to obtain the execution cost for the BHJ type. Specifically, in the case where a data table containing the number of data records greater than the size D of the data block supported by each storage node exists in each auxiliary data table, the execution cost for the BHJ type is ($\Sigma N_i$*M+J, $N_k$*$\Sigma_l$, $N_k$*$\Sigma N_l$*L*WC+$\Sigma N_i$*M*L*RNC). In the case where no data table containing the number of data records greater than the size D of the data block supported by each storage node exists in each auxiliary data table, the execution cost for the BHJ type is ($\Sigma N_i$*M+J, 0, $\Sigma N_i$*M*L*RNC).

As additionally noted above, the BKHJ type of table joining algorithm is another common algorithm that includes a broadcast distribution step and a hash join step. The key operations in the broadcast distribution step include a local read operation, a network read operation, and a local write operation, while the key operation in the hash join step includes the output operation.

After determining the execution steps for the BKHJ type and the key operation in each execution step, the processing device needs to obtain target parameters needed for the execution step from the parameter list for each execution step. Specifically, for the broadcast distribution step in the BKHJ type, the processing device may obtain parameters N, L, RC, RNC, and WC from the parameter list as the target parameters required for the broadcast distribution step. Here, N represents the total number of data records. L represents the average length of each data record. RC represents the unit cost for the local read operation. RNC represents the unit cost for the network read operation. WC represents the unit cost for the local write operation.

For the hash join step in the BKHJ type, the processing device may obtain parameters Nj and n from the parameter list as the target parameters needed for the hash join step. Here, Nj represents the number of data records contained in the j-th data table in the to-be-joined data tables, where j=1 . . . n and n represents the number of data tables in the to-be-joined data tables.

After obtaining the target parameters needed for the broadcast distribution step and the hash join step, the processing device may estimate the execution cost for the key operation in the broadcast distribution step based on the target parameters needed for the broadcast distribution step and the key operation in the broadcast distribution step. Moreover, the processing device may estimate the execution cost for the key operation in the hash join step based on the target parameters needed for the hash join step and the key operation in the hash join step.

Specifically, for the broadcast distribution step in the BKHJ type, the processing device may estimate, based on the above parameters N, L, RC, RNC and WC, that the execution cost for the local read operation represented as a triple is (0, 0, N*L*RC), the execution cost for the network read operation represented as a triple is (N, 0, N*L*RNC), and the execution cost for the local write operation represented as a triple is (0, 0, N*L*WC). For the hash join step in the BKHJ type, the processing device may estimate, based on the above parameters $N_j$ and n, that the execution cost for the output operation represented as a triple is (J, 0, 0), where $J=(\Pi N_j)^{1/n}$.

Further, considering that the number of data records contained in the auxiliary data table might be greater than the size D of the data block supported by each storage node. In this case, the data records need to be written from an internal memory to an external memory. In other words, it turns into a nested loop join. In this case, since the cost for writing the data records from the internal memory to the external memory is very high, it is necessary to take this part of cost into consideration.

Based on the above content, before using the execution cost (J, 0, 0) of the output operation as the execution cost for the hash join step, the processing device needs to determine, in each to-be-joined data table, whether a data table containing the number of data records greater than the size D of the data block supported by each storage node exists.

If the determination result is positive, then the processing device corrects the execution cost (J, 0, 0) of the output operation to obtain a corrected execution cost (J, $N_k*\Sigma N_l$, $N_k*\Sigma N_l*L*WC$) as the execution cost for the hash join step. Here, $N_1$ represents the 1-th data table containing the number of data records greater than the size D of the data block supported by each storage node, where l=1 . . . n and l≠k.

After respectively obtaining the execution costs for the key operation in the broadcast distribution step and the key operation in the hash join step, the processing device may obtain the execution cost for the broadcast distribution step based on the execution cost for the key operation in the broadcast step and obtain the execution cost for the hash join step based on the execution cost for the key operation in the hash join step.

Specifically, for the broadcast distribution step in the BKHJ type, the processing device may superpose the execution cost (0, 0, N*L*RC) of the local read operation, the execution cost (N, 0, N*L*RNC) of the network read operation, and the execution cost (0, 0, N*L*WC) of the local write operation to obtain an execution cost (N, 0, N*L*(RC+RNC+WC)) as the execution cost for the broadcast distribution step.

For the hash join step of the BKHJ type, if a data table containing the number of data records greater than the size D of the data block supported by each storage node exists in each auxiliary data table, then the processing device may use the corrected execution cost (J, $N_k*\Sigma N_l$, $N_k*\Sigma N_l*L*WC$) as the execution cost for the hash join step. If no data table containing the number of data records greater than the size D of the data block supported by each storage node exists in each auxiliary data table, then the processing device may use the execution cost (J, 0, 0, 0) of the output operation as the execution cost for the hash join step.

After obtaining the execution cost for the broadcast distribution step and the execution cost for the hash join step, the processing device may superpose the execution costs of the two execution steps to obtain the execution cost for the BKHJ type. Specifically, in the case where a data table containing the number of data records greater than the size D of the data block supported by each storage node exists in each auxiliary data table, the execution cost for the BKHJ type is (N+J, $N_k*\Sigma N_l$, $N_k*\Sigma N_l*L*WC+N*L*(RC+RNC+WC)$). In the case where no data table containing the number of data records greater than the size D of the data block supported by each storage node exists in each auxiliary data table, the execution cost for the BKHJ type is (N+J, 0, N*L*(RC+RNC+WC)).

After estimating the execution cost for each data table join type candidate in performing join calculations on the to-be-joined data tables (referred to as the execution cost for each data table join type candidate for short), the processing device may select, based on the estimated execution cost for each data table join type candidate in performing join calculations on the to-be-joined data tables, a target data table join type for performing join calculations on the to-be-joined data tables.

Specifically, the processing device may compare the estimated execution cost for each data table join type candidate in performing join calculations on the to-be-joined data tables, and select a data table join type candidate corresponding to the minimum execution cost as the target data table join type. Alternatively, the processing device may select a data table join type candidate corresponding to the optimal execution cost as the target data table join type.

In the above process of selecting the target data table join type, the execution cost needs to be compared. In the case where the execution cost is represented by the above triple (data record number consumption, CPU consumption, and IO consumption), priorities within the triple may be preset to facilitate the comparison.

For example, the priority of the data record number consumption may be set higher than that of the CPU consumption. The priority of the CPU consumption may be set higher than that of the IO consumption. Based on these, when the execution cost for each data table join type candidate is compared, the data record number consumption may be compared with a higher priority, and a data table join type candidate having the minimum data record number consumption can be selected as the target data table join type.

If all data record number consumptions are the same, then the CPU consumption may be compared, and a data table join type candidate having the minimum CPU consumption may be selected as the target data table join type. If all CPU consumptions are the same, then the IO consumption may be compared. A data table join type candidate having the minimum IO consumption is selected as the target data table join type.

In addition to comparing the execution cost for each data table join type candidate based on the priorities within the triple, weights may also be set for the triple which are represented as w1, w2, and w3 respectively. Then an average cost for each data table join type candidate is calculated based on the following formula: average cost=data record number consumption*w1+CPU consumption*w2+IO consumption*w3. A data table join type candidate having the minimum average cost is selected as the target data table join type.

Join calculations are then performed on the to-be-joined data tables based on the selected target data table join type. Because the selected data table join type is suitable for the distributed data warehouse environment, when join calculations between data tables are performed based on the selected data table join type, resources of the distributed data warehouse can be saved and the query efficiency can be improved.

An example of the determination of the execution cost for each data table join type candidate is described in detail below with reference to a specific data table join scenario and specific parameters. The example assumes that join calculations need to be performed on the consumer table and the order table. The consumer table is represented as R, whereas the order table is represented as S. Data records contained in R are 10M and data records contained in S are 10M. The following parameters are set based on the distributed data warehouse environment:

N1=10M;
N2=10M;
N=20M;
L=100 Bytes;
D=256 MB;
G=1 GB;
M=Input/256 MB;
P=Input/1 GB;
RC=1;
WC=2;
RNC=10;
WNC=10.

The G above represents the number of data records supported by a single computing node.

For the PSJ type, corresponding parameters are substituted into the execution cost (N, N, N*L*(RC+RNC+WC)). The execution cost for the re-partition step can be obtained as (20 M, 20 M, 26 GB). In addition, corresponding parameters are substituted into the execution cost (J, 0, 0). The execution cost for the sort join step can be obtained as (20 M, 0, 0 B). The execution cost for the PSJ type is further obtained as (40 M, 20 M, 26 GB).

For the BHJ type, it is calculated that M=N2*L/256 MB=4. In addition, corresponding parameters are substituted into the execution cost ($\Sigma N_i$*M, 0, $\Sigma N_i$*M*L*RNC). The execution cost for the broadcast step can be obtained as (40 M, 0, 4 GB). Further, corresponding parameters are substituted into the execution cost (J, $N_k$*$\Sigma N_j$, $N_k$*$\Sigma N_j$*L*WC). The execution cost for the hash join step can be obtained as (10 M, 10 M*10 M, 10 M*10 M*100*2). The execution cost for the BHJ type is further obtained as (50 M, inf, inf).

For the BKHJ type, it is calculated that P=N*L/1 G=8. In addition, corresponding parameters are substituted into the execution cost (N, 0, N*L*(RC+RNC+WC)). The execution cost for the broadcast distribution step can be obtained as (20

M, 0, 26 GB). Further, corresponding parameters are substituted into the execution cost (J, $N_k$*$\Sigma N_j$, $N_k$*$\Sigma N_j$*L*WC). The execution cost for the hash join step can be obtained as (20 M, 10 M*10 M, 10 M*10 M*100*2). The execution cost for the BKHJ type is further obtained as (40 M, 100 M, 26 GB).

If the priority of the data record number consumption is preset higher than the priority of the CPU consumption and the priority of the CPU consumption is preset higher than the priority of the IO consumption are taken as a basis, then the comparison shows that the execution cost for the PSJ type is lower. Therefore, the PSJ type may be selected.

If data records contained in S are 1K, then what are obtained for the PSJ type include: the execution cost for the re-partition step is (10M, 10M, 13 GB); the execution cost for the sort join step is (100K, 0, 0B); and the execution cost for the PSJ type is (10M, 10M, 13 GB).

For the BHJ method, it is calculated that M=N2*L/256 MB=4. Based on this, what can be obtained are: the execution cost for the broadcast step is (4K, 0, 400K); the execution cost for the hash join step is (100K, 0, 0); and the execution cost for the BHJ type is (104K, 0, 400K).

For the BKHJ type, it is calculated that P=N*L/1G=4. Based on this, what can be obtained are: the execution cost for the broadcast distribution step is (10M, 0, 13 GB); the execution cost for the hash join step is (100K, 0, 0B); and the execution cost for the BKHJ type is (10M, 0, 13 GB).

If that the priority of the data record number consumption is preset higher than the priority of the CPU consumption and the priority of the CPU consumption is preset higher than the priority of the IO consumption are taken as a basis, then the comparison shows that the execution cost for the BHJ type is lower. Therefore, the BHJ type may be selected. Moreover, the execution cost for the BKHJ type is also lower than that of the PSJ type.

Figure 6:
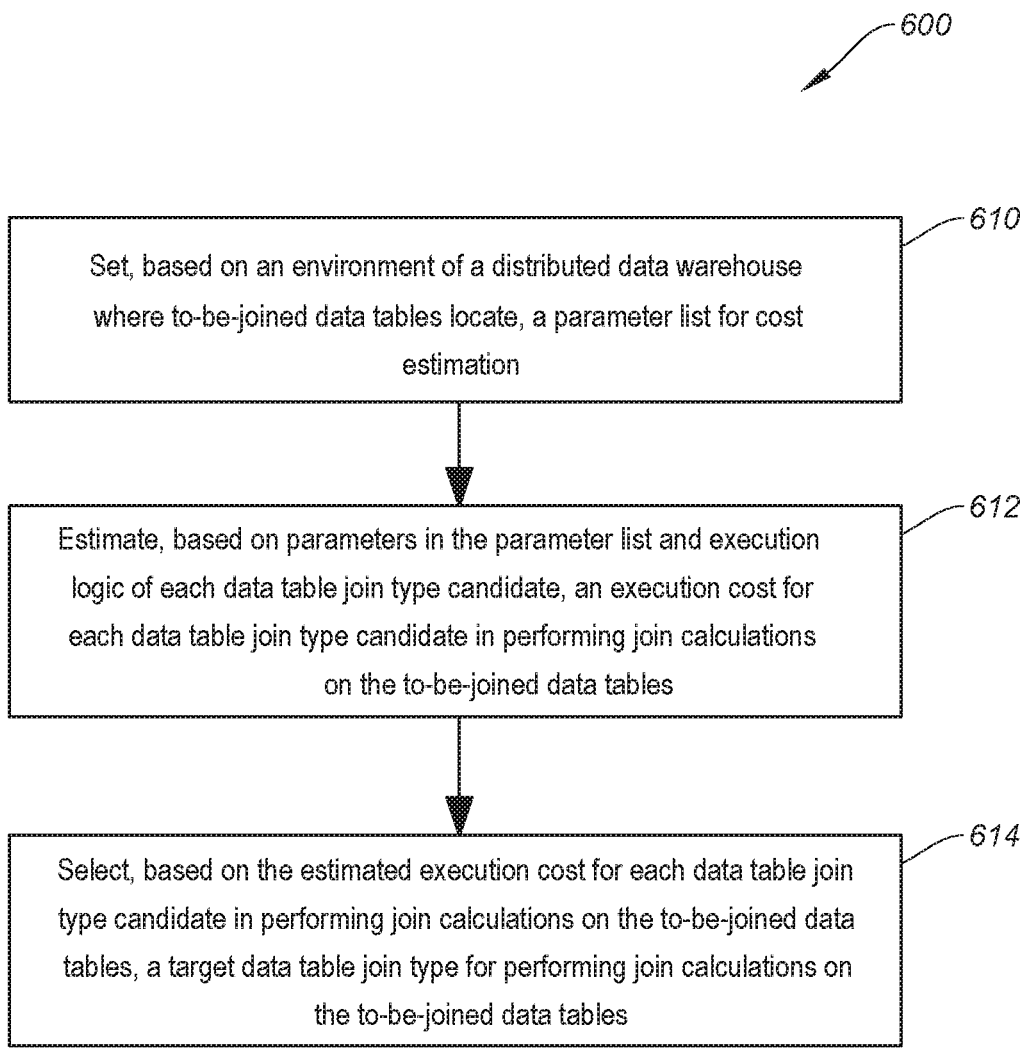
FIG. 6 is a flow chart illustrating an example of a method 600 for processing table joining algorithms (table join type candidates) in accordance with the present invention.

FIG. 6 shows a flow chart that illustrates an example of a method 600 for processing table joining algorithms (table join type candidates) in accordance with the present invention. As shown in FIG. 6, method 600 begins at 610 where a parameter list for an execution cost estimation is set based on the environment of a distributed data warehouse where to-be-joined data tables are located.

Following this, method 600 moves to 612 to estimate, based on parameters in the parameter list and execution logic of each data table join type candidate, an execution cost for each data table join type candidate in performing join calculations on the to-be-joined data tables. Method 600 then moves to 614 to select, based on the estimated execution cost for each data table join type candidate in performing join calculations on the to-be-joined data tables, a target data table join type for performing join calculations on the to-be-joined data tables.

Figure 7:
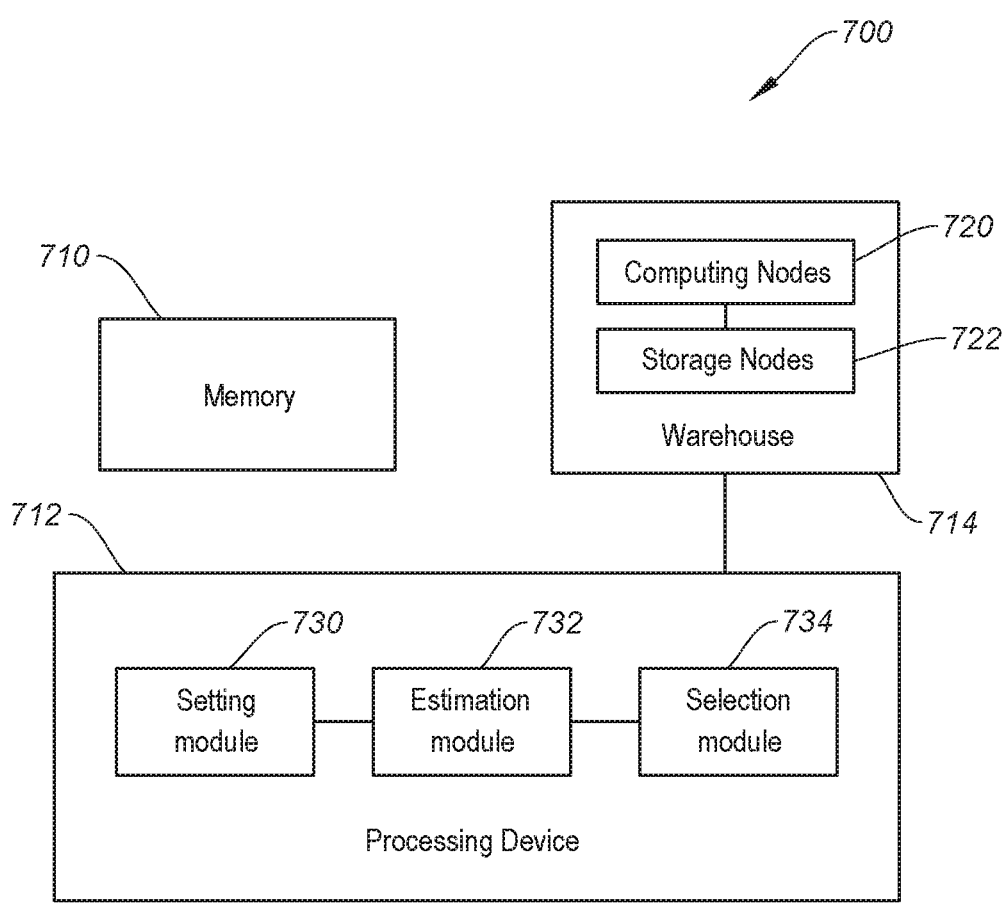
FIG. 7 is a block diagram illustrating an example of a system 700 that joins data tables in accordance with the present invention.

FIG. 7 shows a block diagram that illustrates an example of a system 700 that joins data tables in accordance with the present invention. As shown in FIG. 7, system 700 includes a memory 710 and a processing device 712 that is coupled to memory 710. In addition, system 700 also includes a distributed data warehouse 714 that is coupled to processing device 712. Warehouse 714, in turn, has a number of computing nodes 720 and a number of storage nodes 722. Processing device 712 determines a number of to-be-joined data tables in distributed data warehouse 714.

Processing device 712 also obtains a number of table joining algorithms, and estimates the execution costs for the table joining algorithms such that each table joining algorithm has an estimated execution cost to join the plurality of to-be-joined data tables. In addition, processing device 712 selects a target algorithm from the table joining algorithms based on the estimated execution cost of each table joining algorithm, and joins the plurality of to-be-joined data tables with the target algorithm.

Processing device 712 estimates an execution cost of a table joining algorithm of the number of table joining algorithms by determining a number of execution steps in the table joining algorithm. Following this, processing device 712 estimates an execution cost for each execution step. Processing device 712 then determines the estimated execution cost for the table joining algorithm based on the execution cost for each execution step.

Each execution step has a number of operations. The operations, in turn, include one or more key operations which have higher execution costs than other of the operations. In an embodiment of the present invention, the execution cost of an execution step is based on the execution cost of the one or more key operations in the execution step. The processing device determines, for each data table join type candidate, the execution steps of the data table join type candidate, and a key operation in each execution step.

As further shown in FIG. 7, processing device 712 includes a setting module 730, an estimation module 732, and a selection module 734. Setting module 730 sets, based on an environment of a distributed data warehouse where to-be-joined data tables locate, a parameter list for cost estimation. Estimation module 732 estimates, based on parameters in the parameter list set by the setting module 730 and execution logic of each data table join type candidate, an execution cost for each data table join type candidate in performing join calculations on the to-be-joined data tables. Selection module 734 selects, based on the execution cost for each data table join type candidate in performing join calculations on the to-be-joined data tables estimated by the estimation module 732, a target data table join type for performing join calculations on the to-be-joined data tables.

In an alternative implementation, setting module 730 sets a number of data records, a total number of data records, and an average length of each data record comprised in each data table in the to-be-joined data tables. Setting module 730 also sets, based on a file system of the distributed data warehouse, a size of a data block supported by each storage node. In addition, setting module 730 sets, based on hardware information of the distributed data warehouse, unit costs for various operations needed for join calculations and a number of data records that each computing node can process.

Further, when setting, based on the hardware information of the distributed data warehouse, the unit costs for the various operations needed for join calculations, setting module 730 determines, based on a storage medium used by the distributed data warehouse, a unit cost for a local read operation and a unit cost for a local write operation. Setting module 730 also determines, based on a network topology of the distributed data warehouse, a unit cost for a network read operation and a unit cost for a network write operation.

Figure 8:
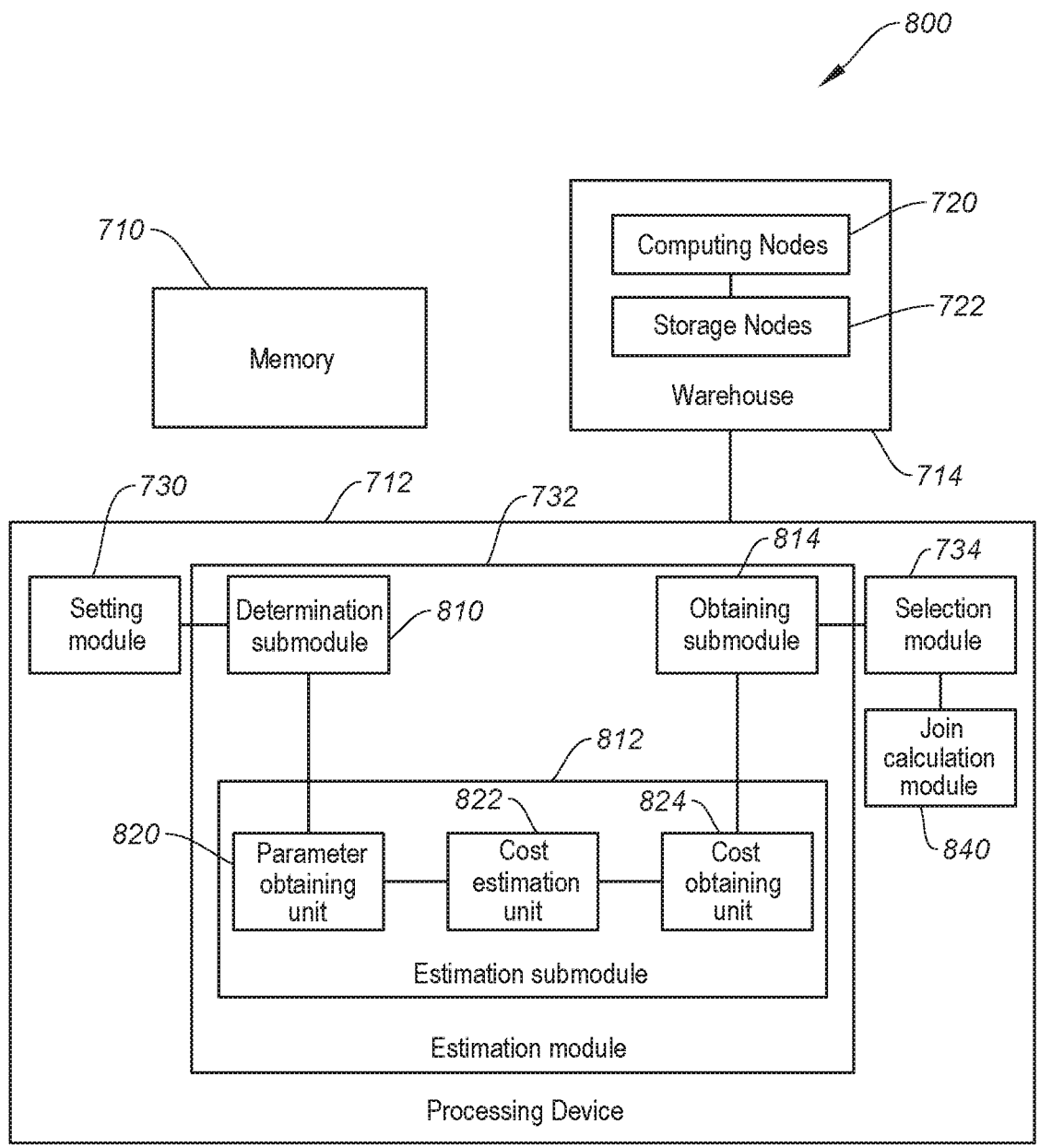
FIG. 8 is a block diagram illustrating an example of a system 800 that joins data tables in accordance with the present invention.

FIG. 8 shows a block diagram that illustrates an example of a system 800 that joins data tables in accordance with the present invention. System 800 is similar to system 700 and, as a result, utilizes the same reference numerals to designate the structures which are common to both systems. As shown in FIG. 8, system 800 differs from system 700 in that processing device 712 of system 800 further includes a determination submodule 810, an estimation submodule 812, and an obtaining submodule 814. Estimation submodule 812, in turn, includes a parameter obtaining unit 820, a cost estimation unit 822, and a cost obtaining unit 824.

Determination submodule 810 determines, for each data table join type candidate, execution steps of the data table join type candidate and a key operation in each execution step. Estimation submodule 812 estimates, based on the parameters in the parameter list and the key operation in each execution step, an execution cost for each execution step. Obtaining submodule 814 obtains, based on the execution cost for each execution step, an execution cost for the data table join type candidate.

Further, parameter obtaining unit 820 obtains, for each execution step, target parameters needed for the execution step from the parameter list. Cost estimation unit 822 estimates, based on the target parameters needed for the execution step and the key operation in the execution step, an execution cost for the key operation in the execution step. Cost obtaining unit 824 obtains, based on the execution cost for the key operation in the execution step, the execution cost for the execution step.

In an alternative implementation, if the data table join type candidate is a partitioned sort join type, then the execution steps of the partitioned sort join type comprise a re-partition step and a sort join step. Key operations in the re-partition step comprise a local read operation, a network read operation, a local sort operation, and a local write operation. A key operation in the sort join step comprises an output operation.

If the data table join type candidate is a broadcasted hash join type, then the execution steps of the broadcasted hash join type comprise a broadcast step and a hash join step. A key operation in the broadcast step comprises the network read operation, and a key operation in the hash join step comprises the output operation.

If the data table join type candidate is a blocked hash join type, then the execution steps of the blocked hash join type comprise a broadcast distribution step and a hash join step. Key operations in the broadcast distribution step comprise the local read operation, the network read operation, and the local write operation. A key operation in the hash join step comprises the output operation.

Further alternatively, the above execution cost is represented by a triple (data record number consumption, CPU consumption, and IO consumption). Based on the above content, parameter obtaining unit 820 obtains, for the re-partition step, parameters N, L, RC, RNC, and WC from the parameter list as target parameters needed for the re-partition step. Obtaining unit 820 also obtains, for the broadcast step, parameters $N_i$, $N_k$, D, L, and RNC from the parameter list as target parameters needed for the broadcast step. In addition, obtaining unit 820 obtains, for the broadcast distribution step, parameters N, L, RC, RNC, and WC from the parameter list as target parameters needed for the broadcast distribution step. Further, obtaining unit 820 obtains, for the sort join step or the hash join step, $N_j$ and n from the parameter list as target parameters needed for the sort join step or the hash join step, where N represents the total number of data records;
L represents the average length of each data record;
RC represents the unit cost for the local read operation;
RNC represents the unit cost for the network read operation;
WC represents the unit cost for the local write operation;
$N_k$ represents the number of data records contained in a main data table in the to-be-joined data tables, where k is any value of 1 . . . n;
$N_i$ represents the number of data records contained in the i-th auxiliary data table in the to-be-joined data tables, where i=1 . . . n and i≠k;

D represents the size of the data block supported by each storage node; and $N_j$ represents a number of data records contained in the j-th data table in the to-be-joined data tables, where j=1 . . . n; and n represents a number of data tables in the to-be-joined data tables.

Cost estimation unit 822, for the re-partition step, estimates, based on the parameters N, L, RC, RNC, and WC, that an execution cost for the local read operation is (0, 0, N*L*RC), an execution cost for the network read operation is (N, 0, N*L*RNC), an execution cost for the local sort operation is (0, N, 0), and an execution cost for the local write operation is (0, 0, N*L*WC).

In addition, cost estimation unit 822, for the broadcast step, estimates, based on the parameters $N_k$, D, L, and RNC, that the execution cost for the network read operation is ($\Sigma N_i$*M, 0, $\Sigma N_i$*M*L*RNC), where M=$N_k$/D. Cost estimation unit 822, for the broadcast distribution step, also estimates, based on the parameters N, L, RC, RNC, and WC, that the execution cost for the local read operation is (0, 0, N*L*RC), the execution cost for the network read operation is (N, 0, N*L*RNC), and the execution cost for the local write operation is (0, 0, N*L*WC). Cost estimation unit 822, for the sort join step or the hash join step, further estimates, based on the parameters $N_j$ and n, that an execution cost for the output operation is (J, 0, 0), where J=$(\Pi N_j)^{1/n}$.

Cost obtaining unit 824, for the re-partition step, superposes the execution cost (0, 0, N*L*RC) of the local read operation, the execution cost (N, 0, N*L*RNC) of the network read operation, the execution cost (0, N, 0) of the local sort operation, and the execution cost (0, 0, N*L*WC) of the local write operation to obtain an execution cost (N, N, N*L*(RC+RNC+WC)) as the execution cost for the re-partition step.

In addition, cost obtaining unit 824, for the broadcast step, uses the execution cost ($\Sigma N_i$*M, 0, $\Sigma N_i$*M*L*RNC) of the network read operation as an execution cost for the broadcast step. Further, cost obtaining unit 824, for the broadcast distribution step, superposes the execution cost (0, 0, N*L*RC) of the local read operation, the execution cost (N, 0, N*L*RNC) of the network read operation, and the execution cost (0, 0, N*L*WC) of the local write operation to obtain an execution cost (N, 0, N*L*(RC+RNC+WC)) as an execution cost for the broadcast distribution step. Cost obtaining unit 824, for the sort join step or the hash join step, also uses the execution cost (J, 0, 0) of the output operation as an execution cost for the sort join step or the hash join step.

Further, cost obtaining unit 824 further, prior to the step of superposing, for the re-partition step, the execution cost (0, 0, N*L*RC) of the local read operation, the execution cost (N, 0, N*L*RNC) of the network read operation, the execution cost (0, N, 0) of the local sort operation, and the execution cost (0, 0, N*L*WC) of the local write operation to obtain an execution cost (N, N, N*L*(RC+RNC+WC)) as an execution cost for the re-partition step, determine whether a skewed distribution occurs with respect to the data records contained in the to-be-joined data tables. If the determination result is positive, then correct the execution cost (N, 0, N*L*RNC) of the network read operation to (N, 0, P*N*L*p*RNC) and correct the execution cost (0, 0, N*L*WC) of the local write operation to (0, 0, P*N*L*p*WC), where p represents a distribution skewness, and P represents a number of computing nodes for performing a join processing on the to-be-joined data tables.

Further, cost obtaining unit 824 is further configured to do the following: prior to the using, for the hash join step, the execution cost (J, 0, 0) of the output operation as the execution cost for the sort join step or the hash join step, determine whether a data table containing the number of data records greater than the size D of the data block supported by each storage node exists in each auxiliary data table. If the determination result is positive, then correct the execution cost (J, 0, 0) of the output operation to obtain a corrected execution cost (J, $N_k$*$\Sigma N_l$, $N_k$*$\Sigma N_l$*L*WC) as the execution cost for the hash join step. Here, Nl represent the l-st data table having a number of data records greater than the size D of the data block supported by each storage node; and l=1 . . . n and l≠k.

Further, as shown in FIG. 8, processing device 712 further includes a join calculation module 840. Join calculation module 840 uses the target data table join type selected by the selection module 714 to perform join calculations to join the to-be-joined data tables.

In the device for processing data table join types of the present application, a parameter list for cost estimation is set based on an environment of a distributed data warehouse where to-be-joined data tables locate. An execution cost for each data table join type candidate in performing join calculations on the to-be-joined data tables is estimated based on parameters in the parameter list and execution logic of each data table join type candidate.

A target data table join type for performing join calculations on the to-be-joined data tables is selected based on the estimated execution cost for each data table join type candidate in performing join calculations on the to-be-joined data tables, so as to select a data table join type suitable for the distributed data warehouse environment. In this way, when join calculations between data tables are performed based on the selected data table join type, resources of the distributed data warehouse can be saved and the query efficiency can be improved.

In the several embodiments provided by the present application, it should be understood that the disclosed systems, devices, and methods can be implemented in other manners. For example, the device embodiment described above is merely illustrative. For example, the division of the units is merely a logical function division; other division methods in practical implementation may exist, like a plurality of units or components can be combined or can be integrated into another system; or some features can be ignored or are not executed. Additionally, the intercoupling, direct coupling, or communication connection displayed or discussed may be electrical, mechanical or other forms through some interfaces, indirect coupling or communication connection of the device or the units.

The units described as separate parts may or may not be physically separated, and the parts shown as units may or may not be physical units, which may be located in one place or may be distributed onto a plurality of network units. The objective of the solution of this embodiment may be implemented by selecting a part of or all the units according to actual requirements.

In addition, various functional units in the embodiments of the present application may be integrated in one processing unit, or the units exist physically and separately, or two or more units are integrated in one unit. The above integrated unit may be implemented by using hardware, and may also be implemented in a form of hardware plus a software functional unit.

The integrated unit implemented in the form of a software functional unit may be stored in a computer readable storage medium. The software functional unit is stored in a storage medium, and includes several instructions that enable a computer device (which may be a personal computer, a server, a network device or the like) or a processor or processing device to execute the method in the embodiments of the present application. The foregoing storage medium includes various media capable of storing program code, including a USB flash disk, a mobile hard disk, a Read-Only Memory (ROM), a Random Access Memory (RAM), a magnetic disk, an optical disc, or the like.

It should be finally noted that the above embodiments are merely used for illustrating rather than limiting the technical solutions of the present application. Although the present application is described in detail with reference to the foregoing embodiments, those of ordinary skill in the art should understand that the technical solutions recorded in the foregoing embodiments may still be modified or equivalent replacement may be made on partial technical features therein. These modifications or replacements will not make the essence of the corresponding technical solutions be departed from the spirit and scope of the technical solutions in the embodiments of the present application.

Described above are preferred examples of the present invention. It should be noted that persons of ordinary skill in the art may derive other improvements or polishments without departing from the principles of the present invention. Such improvements and polishments shall be deemed as falling within the protection scope of the present invention.

The above descriptions are merely preferred embodiments of the present invention. It should be pointed out that those of ordinary skill in the art can make several improvements and modifications without departing from the principle of the present invention, and the improvements and modifications should also be construed as falling within the protection scope of the present invention.

What is claimed is:

1. A method of joining data tables, the method comprising:
   determining a plurality of to-be-joined data tables in a distributed data warehouse that has a plurality of computing nodes and a plurality of storage nodes;
   setting, based on an environment of the distributed data warehouse where the plurality of to-be-joined data tables are located, a parameter list for cost estimation;
   obtaining a plurality of table joining algorithms;
   estimating a plurality of execution costs for the plurality of table joining algorithms such that each of the plurality of table joining algorithms has an estimated execution cost to join the plurality of to-be-joined data tables, wherein the estimating comprises:
      determining, for each of the plurality of table joining algorithms, a number of execution steps and one or more key operations of a plurality of operations in each of the execution steps;
      estimating an execution cost for each of the execution steps based on:
         computing execution costs of the one or more key operations in each of the execution steps based on parameters selected from the parameter list for the one or more key operations; and
         determining the execution cost for each of the execution steps based on at least one of: superposing the execution costs of the one or more key operations, and directly using [[the]]an execution cost of a selected key operation out of the one or more key operations; and
      determining the estimated execution cost for each of the plurality of table joining algorithms based on the execution cost for each of the execution steps;
   selecting a target algorithm from the plurality of table joining algorithms based on the estimated execution cost of each of the plurality of table joining algorithms; and
   joining the plurality of to-be-joined data tables with the target algorithm.

2. The method according to claim 1, wherein:
   execution steps of a Partitioned Sort Join (PSJ) table joining algorithm include:
      a re-partition execution step having a plurality of key operations, wherein the plurality of key operations in the re-partition execution step includes a local read operation, a network read operation, a local sort operation, and a local write operation; and
      a sort join execution step having a key operation, wherein the key operation in the sort join execution step includes an output operation;
   execution steps of a Broadcasted Hash Join (BHJ) table joining algorithm include:
      a broadcast execution step having a key operation, wherein the key operation in the broadcast execution step includes the network read operation; and
      a hash join execution step having a key operation, wherein the key operation in the hash join execution step includes the output operation; and
   execution steps of a Blocked Hash Join (BKHJ) table joining algorithm include:
      a broadcast distribution execution step having a plurality of key operations, wherein the plurality of key operations in the broadcast distribution execution step includes the local read operation, the network read operation, and the local write operation; and
      a hash join execution step having a key operation, wherein the key operation in the hash join execution step includes the output operation.

3. The method according to claim 2, further comprising obtaining target parameters needed for each of the execution steps, wherein obtaining the target parameters includes:
   for the re-partition execution step, obtaining parameters N, L, RC, RNC, and WC as target parameters needed for the re-partition execution step;
   for the broadcast execution step, obtaining parameters $N_i$, $N_k$, D, L, and RNC as target parameters needed for the broadcast execution step;
   for the broadcast distribution execution step, obtaining parameters N, L, RC, RNC, and WC as target parameters needed for the broadcast distribution execution step; and
   for the sort join execution step or the hash join execution step, obtaining NJ and n as target parameters needed for the sort join execution step or the hash join execution step, where
   N represents a total number of data records;
   L represents an average length of each of the data records;
   RC represents a unit cost for the local read operation;
   RNC represents a unit cost for the network read operation;
   WC represents a unit cost for the local write operation;
   Nk represents a number of data records contained in a main data table in the plurality of to-be-joined data tables, where k is any value of 1. . . n;
   $N_i$ represents a number of data records contained in an i-th auxiliary data table in the plurality of to-be-joined data tables, where i=1. . . n and i≠k;

D represents a size of a data block supported by each of the plurality of storage nodes based on a file system of the distributed data warehouse;

$N_j$ represents a number of data records contained in a j-th data table in the plurality of to-be-joined data tables, where j=1 . . . n; and n represents a number of data tables in the plurality of to-be-joined data tables.

4. The method according to claim 3, wherein estimating the execution cost includes:

for the re-partition execution step, estimating an execution cost for the local read operation as a data record number consumption of 0, a CPU consumption of 0, and an I/O consumption of N*L*RC (0, 0, N*L*RC), an execution cost for the network read operation as a data record number consumption of N, a CPU consumption of 0, and an I/O consumption of N*L*RNC (N, 0, N*L*RNC), an execution cost for the local sort operation as the data record number consumption of 0, the CPU consumption of N, and the I/O consumption of 0 (0, N, 0), and an execution cost for the local write operation as the data record number consumption of 0, a CPU consumption of 0, and the I/O consumption of N*L*WC (0, 0, N*L*WC) based on the parameters N, L, RC, RNC, and WC;

for the broadcast execution step, estimating the execution cost for the network read operation as the data record number consumption of $\Sigma N_i$*M, the CPU consumption of 0, and the I/O consumption of $\Sigma N_i$*M*L*RNC ($\Sigma N_i$*M, 0, $\Sigma N_i$*M*L*RNC) based on the parameters $N_i$, $N_k$, D, L, and RNC, where M=$N_k$/D;

for the broadcast distribution execution step, estimating the execution cost for the local read operation as the data record number consumption of 0, the CPU consumption of 0, and the I/O consumption of N*L*RC (0, 0, N*L*RC), the execution cost for the network read operation as the data record number consumption of N, the CPU consumption of 0, and the I/O consumption of N*L*RNC (N, 0, N*L*RNC), and the execution cost for the local write operation as the data record number consumption of 0, the CPU consumption of 0, and the I/O consumption of N*L*WC (0, 0, N*L*WC) based on the parameters N, L, RC, RNC, and WC; and for the sort join execution step or the hash join execution step, estimating an execution cost for the output operation as the data record number consumption of J, the CPU consumption of 0, and the I/O consumption of 0 (J, 0, 0) based on the parameters $N_j$ and n, where $J=(\Pi N_j)^{1/n}$.

5. The method according to claim 4, wherein estimating an execution cost further includes:

for the re-partition execution step, superposing the execution cost (0, 0, N*L*RC) of the local read operation, the execution cost (N, 0, N*L*RNC) of the network read operation, the execution cost (0, N, 0) of the local sort operation, and the execution cost (0, 0, N*L*WC) of the local write operation to obtain an execution cost (N, N, N*L*(RC+RNC+WC)) as an execution cost for the re-partition execution step;

for the broadcast execution step, using the execution cost ($\Sigma_i$*M, 0, $\Sigma N_i$*M*L*RNC) for the network read operation as an execution cost for the broadcast execution step;

for the broadcast distribution execution step, superposing the execution cost (0, 0, N*L*RC) for the local read operation, the execution cost (N, 0, N*L*RNC) for the network read operation, and the execution cost (0, 0, N*L*WC) for the local write operation to obtain an execution cost (N, 0, N*L*(RC+RNC+WC)) as an execution cost for the broadcast distribution execution step; and for the sort join execution step or the hash join execution step, using the execution cost (J, 0, 0) for the output operation as an execution cost for the sort join execution step or the hash join execution step.

6. The method according to claim 5, wherein prior to, for the re-partition execution step, superposing the execution cost (0, 0, N*L*RC) of the local read operation, the execution cost (N, 0, N*L*RNC) of the network read operation, the execution cost (0, N, 0) of the local sort operation, and the execution cost (0, 0, N*L*WC) of the local write operation to obtain an execution cost (N, N, N*L*(RC+RNC+WC)) as an execution cost for the re-partition execution step:

determining whether a skewed distribution occurs with respect to data records contained in the to-be-joined data tables; and if a determination result is positive, then correcting the execution cost (N, 0, N*L*RNC) for the network read operation to (N, 0, P*N*L*p*RNC) and correcting the execution cost (0, 0, N*L*WC) for the local write operation to (0, 0, P*N*L*p*WC), where p represents a distribution skewness; and P represents a number of computing nodes for performing a join processing on the to-be-joined data tables.

7. The method according to claim 6, wherein prior to, for the hash join execution step, using the execution cost (J, 0, 0) for the output operation as the execution cost for the hash join execution step:

determining whether a data table having a number of data records greater than the size D of the data block supported by each of the plurality of storage node exists in each auxiliary data table; and if a determination result is positive, then correcting the execution cost (J, 0, 0) for the output operation to obtain a corrected execution cost (J, $N_k$*$\Sigma N_l$, $N_k$*$\Sigma N_l$*L*WC) as the execution cost for the hash join execution step, where $N_l$ represent an l-st data table having a number of data records greater than the size D of the data block supported by each of the plurality of storage node; and l=1 . . . n and l≠k.

8. The method according to claim 1, wherein setting the parameter list includes:

setting a number of data records, a total number of data records, and an average length of each data record comprised in each data table in the plurality of to-be-joined data tables;

setting, based on a file system of the distributed data warehouse, a size of a data block supported by each of the plurality of storage nodes; and setting, based on hardware information of the distributed data warehouse, unit costs for operations needed for join calculations and a number of data records that each computing node can process.

9. The method according to claim 8, wherein setting the unit costs for the operations needed for the join calculations includes:

determining, based on a storage medium used by the distributed data warehouse, a unit cost for a local read operation and a unit cost for a local write operation; and determining, based on a network topology of the distributed data warehouse, a unit cost for a network read operation and a unit cost for a network write operation.

10. The method according to claim 1, wherein the execution cost is represented by a data record number consumption, a CPU consumption, and an I/O consumption.

11. The method according to claim 1, wherein estimating the execution cost for each of the execution steps is further based on:
   determining at least one of:
      a skewed distribution with respect to data records included in the plurality of to-be-joined data tables; and
      existence of a data table including data records greater than a data block size supported by each of the plurality of storage nodes; and
   correcting the computed execution cost of the one or more key operations based on the determination of at least one of the skewed distribution and the existence of a data table.

12. The method according to claim 1, wherein one or more execution steps have the plurality of operations, and wherein the one or more key operations have higher execution costs than other operations of the plurality of operations.

13. A non-transitory computer-readable storage medium having embedded therein program instructions, which when executed by a processor causes the processor to execute a method of joining data tables, the method comprising:
   determining a plurality of to-be-joined data tables in a distributed data warehouse that has a plurality of computing nodes and a plurality of storage nodes;
   setting, based on environment of the distributed data warehouse where the plurality of to-be-joined data tables are located, a parameter list of cost estimation;
   obtaining a plurality of table joining algorithms;
   estimating a plurality of execution costs for the plurality of table joining algorithms such that each table joining algorithm has an estimated execution cost to join the plurality of to-be-joined data tables, wherein the estimating comprises;
      determining, for each of the plurality of table joining algorithms, a number of execution steps and one or more key operations of a plurality of operations in each of the execution steps;
      estimating an execution cost for each of the execution steps based on:
         computing execution costs of the one or more key operations in each of the execution steps based on parameters selected from the parameter list for the one or more key operations; and
         determining the execution cost for each of the execution steps based on at least one of: superposing the execution costs of the one or more key operations, and directly using an execution cost of a selected key operation out of the one or more key operations; and
      determining the estimated execution cost for each of the plurality of table joining algorithms based on the execution cost for each of the execution steps;
   selecting a target algorithm from the plurality of table joining algorithms based on the estimated execution cost of each of the plurality of table joining algorithms; and
   joining the plurality of to-be-joined data tables with the target algorithm.

14. The non-transitory computer-readable storage medium according to claim 13, wherein:
   execution steps of a Partitioned Sort Join (PSJ) table joining algorithm include:
      a re-partition execution step having a plurality of key operations, wherein the plurality of key operations in the re-partition execution step includes a local read operation, a network read operation, a local sort operation, and a local write operation; and
      a sort join execution step having a key operation, wherein the key operation in the sort join execution step includes an output operation;
   execution steps of a Broadcasted Hash Join (BHJ) table joining algorithm include:
      a broadcast execution step having a key operation, wherein the key operation in the broadcast execution step includes the network read operation; and
      a hash join execution step having a key operation, wherein the key operation in the hash join execution step includes the output operation; and
   execution steps of a Blocked Hash Join (BKHJ) table joining algorithm include:
      a broadcast distribution execution step having a plurality of key operations, wherein the plurality of key operations in the broadcast distribution execution step includes the local read operation, the network read operation, and the local write operation; and
      a hash join execution step having a key operation, wherein the key operation in the hash join execution step includes the output operation.

15. The non-transitory computer-readable storage medium according to claim 14, wherein the method further comprises obtaining target parameters needed for each of the execution steps, and wherein obtaining the target parameters includes:
   for the re-partition execution step, obtaining parameters N, L, RC, RNC, and WC as target parameters needed for the re-partition execution step;
   for the broadcast execution step, obtaining parameters $N_i$, $N_k$, D, L, and RNC as target parameters needed for the broadcast execution step;
   for the broadcast distribution execution step, obtaining parameters N, L, RC, RNC, and WC as target parameters needed for the broadcast distribution execution step; and
   for the sort join execution step or the hash join execution step, obtaining NJ and n as target parameters needed for the sort join execution step or the hash join execution step, where
   N represents a total number of data records;
   L represents an average length of each of the data records;
   RC represents a unit cost for the local read operation;
   RNC represents a unit cost for the network read operation;
   WC represents a unit cost for the local write operation;
   $N_k$ represents a number of data records contained in a main data table in the plurality of to-be-joined data tables, where k is any value of 1 . . . n;
   $N_i$ represents a number of data records contained in an i-th auxiliary data table in the plurality of to-be-joined data tables, where i=1...n and i≠k;
   D represents a size of a data block supported by each of the plurality of storage nodes based on a file system of the distributed data warehouse;
   $N_j$ represents a number of data records contained in a j-th data table in the plurality of to-be-joined data tables, where j=1 . . . n; and
   n represents a number of data tables in the plurality of to-be-joined data tables.

16. The non-transitory computer-readable storage medium according to claim 15, wherein estimating the execution cost includes:

for the re-partition execution step, estimating an execution cost for the local read operation as a data record number consumption of 0, a CPU consumption of 0, and an I/O consumption of N*L*RC (0, 0, N*L*RC), an execution cost for the network read operation as a data record number consumption of N, a CPU consumption of 0, and an I/O consumption of N*L*RNC (N, 0, N*L*RNC), an execution cost for the local sort operation as the data record number consumption of 0, the CPU consumption of N, and the I/O consumption of 0 (0, N, 0), and an execution cost for the local write operation as the data record number consumption of 0, the CPU consumption of 0, and the I/O consumption of N*L*WC (0, 0, N*L*WC) based on the parameters N, L, RC, RNC, and WC;

for the broadcast execution step, estimating the execution cost for the network read operation as the data record number consumption of $\Sigma N_i*M$, the CPU consumption of 0, and the I/O consumption of $\Sigma N_i*M*L*RNC$ ($\Sigma N_i*M$, 0, $\Sigma N_i*M*L*RNC$) based on the parameters $N_i$, $N_k$, D, L, and RNC, where $M=N_k/D$;

for the broadcast distribution execution step, estimating the execution cost for the local read operation as the data record number consumption of 0, the CPU consumption of 0, and the I/O consumption of N*L*RC (0, 0, N*L*RC), the execution cost for the network read operation as the data record number consumption of N, the CPU consumption of 0, and the I/O consumption of N*L*RNC (N, 0, N*L*RNC), and the execution cost for the local write operation as the data record number consumption of 0, the CPU consumption of 0, and the I/O consumption of N*L*WC (0, 0, N*L*WC) based on the parameters N, L, RC, RNC, and WC; and for the sort join execution step or the hash join execution step, estimating an execution cost for the output operation as the data record number consumption of J, the CPU consumption of 0, and the I/O consumption of 0 (J, 0, 0) based on the parameters $N_J$ and n, where $J=(\Pi N_j)_{1/n}$.

17. The non-transitory computer-readable storage medium according to claim 15, wherein estimating the execution cost further includes:

for the re-partition execution step, superposing the execution cost (0, 0, N*L*RC) of the local read operation, the execution cost (N, 0, N*L*RNC) of the network read operation, the execution cost (0, N, 0) of the local sort operation, and the execution cost (0, 0, N*L*WC) of the local write operation to obtain an execution cost (N, N, N*L*(RC+RNC+WC)) as an execution cost for the re-partition execution step;

for the broadcast execution step, using the execution cost ($\Sigma N_i*M$, 0, $\Sigma N_i*M*L*RNC$) for the network read operation as an execution cost for the broadcast execution step;

for the broadcast distribution execution step, superposing the execution cost (0, 0, N*L*RC) for the local read operation, the execution cost (N, 0, N*L*RNC) for the network read operation, and the execution cost (0, 0, N*L*WC) for the local write operation to obtain an execution cost (N, 0, N*L*(RC+RNC+WC)) as an execution cost for the broadcast distribution execution step; and for the sort join execution step or the hash join execution step, using the execution cost (J, 0, 0) for the output operation as an execution cost for the sort join execution step or the hash join execution step.

18. The non-transitory computer-readable storage medium according to claim 17, wherein prior to, for the repartition execution step, superposing the execution cost (0, 0, N*L*RC) of the local read operation, the execution cost (N, 0, N*L*RNC) of the network read operation, the execution cost (0, N, 0) of the local sort operation, and the execution cost (0, 0, N*L*WC) of the local write operation to obtain an execution cost (N, N, N*L*(RC+RNC+WC)) as an execution cost for the re-partition execution step:

determining whether a skewed distribution occurs with respect to data records contained in the plurality of to-be-joined data tables; and if a determination result is positive, then correcting the execution cost (N, 0, N*L*RNC) for the network read operation to (N, 0, P*N*L*p*RNC) and correcting the execution cost (0, 0, N*L*WC) for the local write operation to (0, 0, P*N*L*p*WC), where p represents a distribution skewness; and P represents a number of computing nodes for performing a join processing on the to-be-joined data tables.

19. The non-transitory computer-readable storage medium according to claim 18, wherein prior to, for the hash join execution step, using the execution cost (J, 0, 0) for the output operation as the execution cost for the hash join execution step:

determining whether a data table having a number of data records greater than the size D of the data block supported by each of the plurality of storage nodes exists in each auxiliary data table; and if a determination result is positive, then correcting the execution cost (J, 0, 0) for the output operation to obtain a corrected execution cost (J, $N_k*\Sigma N_l$, $N_k*\Sigma N_l*L*WC$) as the execution cost for the hash join execution step, where $N_l$ represent an l-st data table having a number of data records greater than the size D of the data block supported by each of the pluraity of storage node; and l=1 . . . n and l≠k.

20. A system for joining data tables, the system comprising:

a memory; and a processor coupled to the memory, the processor to:

determine a plurality of to-be-joined data tables in a distributed data warehouse that has a plurality of computing nodes and a plurality of storage nodes;

set, based on an environment of the distributed data warehouse where the plurality of to-be-joined data tables are located, a parameter list for cost estimation obtain a plurality of table joining algorithms;

estimate a plurality of execution costs for the plurality of table joining algorithms such that each of the plurality of table joining algorithm has an estimated execution cost to join the plurality of to-be-joined data tables, wherein the estimation comprises;

determine, for each of the plurality of table joining algorithms, a number of execution steps and one or more key operations of a plurality of operations in each of the execution steps; and estimate an execution cost for each of the execution steps based on:

computing execution costs of the one or more key operations in each of the execution steps based on parameters selected from the parameter list for the one or more key operations; and determining the execution cost for each of the execution steps based on at least one of: superposing the execution costs of the one or more key operations, and directly using an execution cost of a selected key operation out of the one or more key operations;

select a target algorithm from the plurality of table joining algorithms based on the estimated execution cost of each of the plurality of table joining algorithms; and join the plurality of to-be-joined data tables with the target algorithm.

* * * * *